United States Patent [19]

Vora et al.

[11] Patent Number: 4,622,630
[45] Date of Patent: Nov. 11, 1986

[54] DATA PROCESSING SYSTEM HAVING UNIQUE BUS CONTROL PROTOCOL

[75] Inventors: Chandra R. Vora, Northboro; Michael L. Ziegler, Whitinsville, both of Mass.; Mark Bagula, Morgan Hill; Steve Hamilton, Los Gatos, both of Calif.

[73] Assignee: Data General Corporation, Westboro, Mass.

[21] Appl. No.: 546,514

[22] Filed: Oct. 28, 1983

[51] Int. Cl.$^4$ .................................................. G06F 9/00
[52] U.S. Cl. ...................................... 364/134; 364/900
[58] Field of Search ... 364/200 MS File, 900 MS File, 364/134; 340/825.5

[56] References Cited

U.S. PATENT DOCUMENTS

| | | | |
|---|---|---|---|
| 4,292,668 | 9/1981 | Miller et al. | 364/200 |
| 4,300,194 | 11/1981 | Bradley et al. | 364/200 |
| 4,316,244 | 2/1982 | Grondalski | 364/200 |
| 4,371,925 | 2/1983 | Carberry et al. | 364/200 |

Primary Examiner—Gareth D. Shaw
Assistant Examiner—John G. Mills
Attorney, Agent, or Firm—Robert F. O'Connell

[57] ABSTRACT

In a data processing system which uses a common bus for communication of address and data information among a plurality of system components, a bus timing technique uses a clock signal having a transfer time period which comprises a plurality of subperiods which requires address transfer to take place during a first selected group of subperiods and data to be transferred during a second selected group of subperiods with idle subperiods in between. A first control signal is generated by the data receiving or data supplying unit in order to inhibit access to the bus until such transfer is completed and a second control signal can be provided to lock-in bus access by such unit if desired for more than one transfer period. Appropriate priority is arranged for bus access among selected system components whether the common bus system has a single bus for use with a single port memory or a dual bus for use with a dual port memory.

13 Claims, 14 Drawing Figures

DUAL BUS PRIORITY

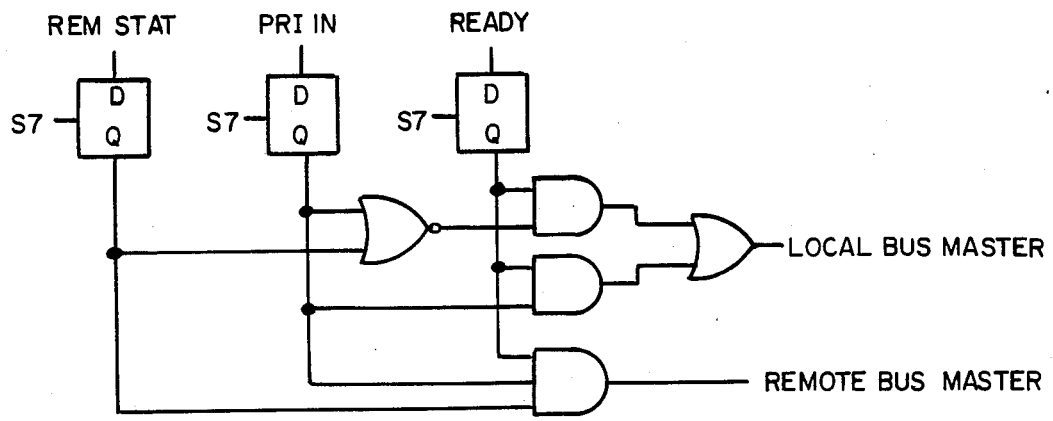
FIG. 12 (CPII)
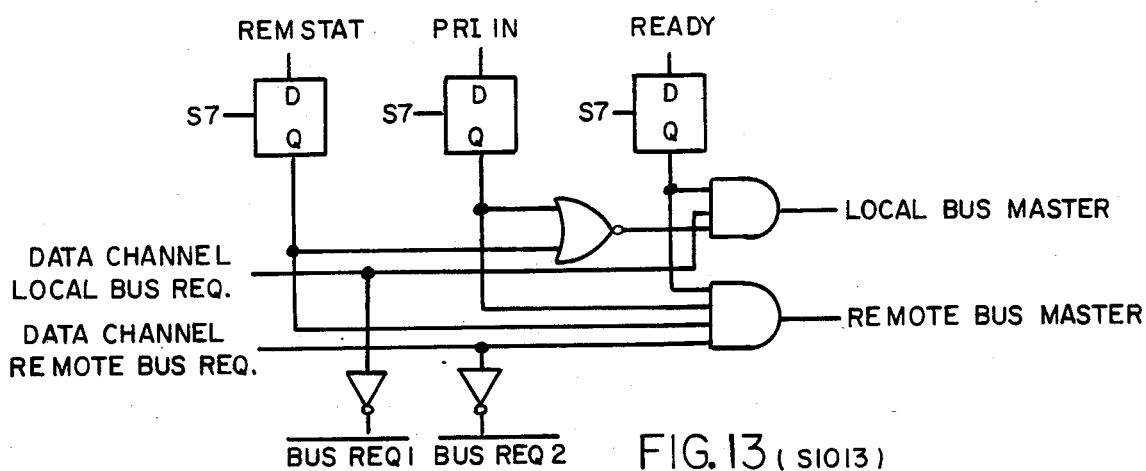
FIG. 13 (SIO13)
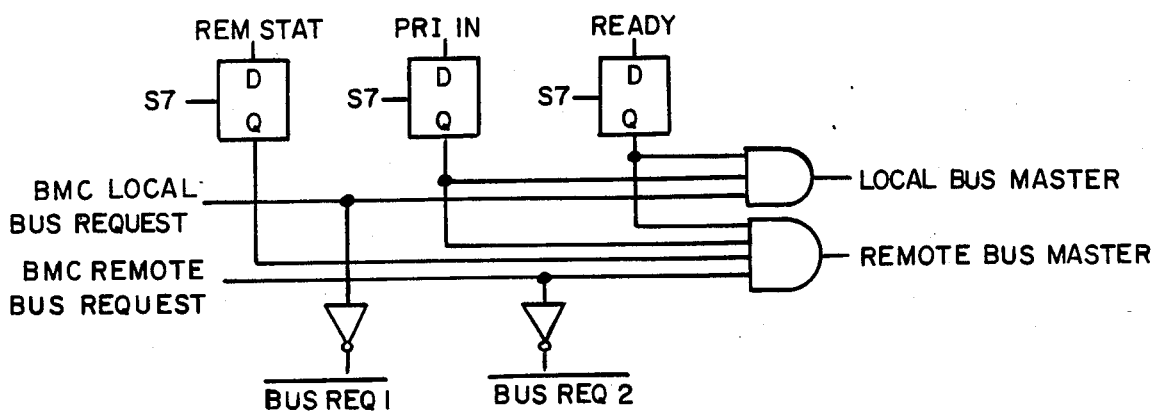
FIG. 14 (BMC14)

DATA PROCESSING SYSTEM HAVING UNIQUE BUS CONTROL PROTOCOL

INTRODUCTION

This invention relates generally to data processing systems and, more particularly, to a system having a unique bus control operation and protocol.

BACKGROUND OF THE INVENTION

Data processing systems which use a common bus for communication of address and data information from system components to a main memory and among the system component themselves require appropriate bus protocols, i.e., bus operating signals, for providing appropriate use of the bus by the system components involved. One such system, for example, is shown in U.S. Pat. No. 4,371,925, issued on Feb. 1, 1983 to Carberry et al., in which a system utilizing a single system bus has a plurality of system components thereon both for controlling the operation of the data processing system and for providing communication with input/output (I/O) devices via one or more suitable I/O interface units. In order to make effective use of the common bus, the system utilized a 2-phase timing signal which permitted address information to be placed on the bus only during the first phase and data information to be placed on the bus normally during the second phase, although sometimes during both phases. To avoid "bus fighting" conditions between two components requesting access thereto, the system utilized two control signals, an address enable signal and a data enable signal, a component having control of the bus asserting the first signal when a valid address was being placed thereon and asserting the second signal when valid data was being placed thereon. Assertion of such signals inhibited the placing of addresses and data on the bus by any other system component. The use of a dual phase operating timing signal and the need for such control signals tend to provide added control complications which it is desirable to simplify. Moreover, the system bus protocols used therein are not readily and efficiently adaptable for a system which utilizes two buses available for common use, for example, in order to supply a dual port main memory. It is desirable, therefore, to devise a system having a more effective bus protocol and operation for both single and dual common bus operations.

SUMMARY OF THE INVENTION

In accordance with the invention an overall time period representing an operating time cycle for a transaction comprises eight subperiods, selected ones thereof being used for placing addresses on one or more common buses and other selected subperiods used to place data thereon. The address time subperiods are preceded and followed by "idle" subperiods in which no data or address information can be placed on a bus. The use of such idle cycles prevents "bus fighting" operations. Appropriate signals are utilized in order to provide for the use of either a single common bus for transfer of addresses and data to or from a single port memory, for example, or for the use of two common buses, separated by appropriate transceiver logic circuitry for permitting or preventing information transfer between buses, for transferring address and data information to or from a dual port memory. Components resident on one of the common buses can obtain system access to both common buses for transactions both between a component and memory and between system components themselves using suitable bus protocol signals for assuring that only a single component has master control of one or both buses and for establishing appropriate priorities among the system components when more than one is trying to access the bus at one time.

DESCRIPTION OF THE INVENTION

The invention can be described more fully with the help of the accompanying drawings wherein FIG. 1 shows a block diagram of a data processing system of the invention utilizing a single common system bus configuration;

FIGS. 11–14 show block and specific logic diagrams for showing the generation of the signals discussed with reference to the bus protocol of FIGS. 1–10.

Figure 1:
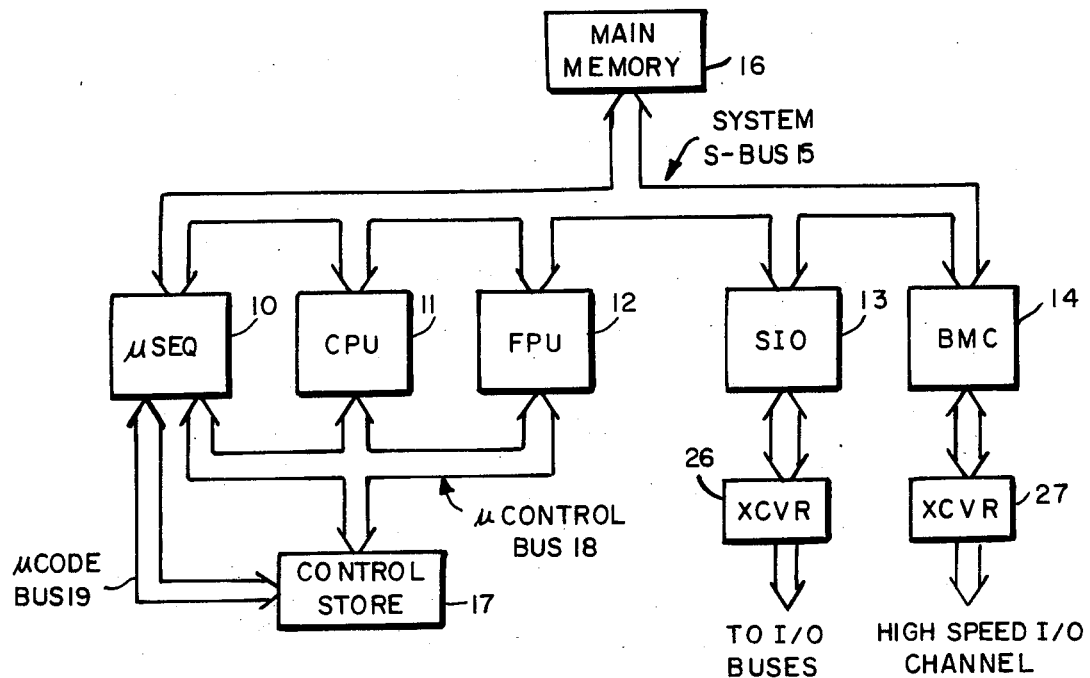

FIG. 1 depicts a data processing system using a single common bus configuration wherein a plurality of system components 10, 11, 12, 13 and 14, for example, are in communication with common system bus 15 which permits transfer of information to and from a single port main memory 16 as well as transfer of information among selected system components themselves. The particular embodiment discussed includes a central processor unit (CPU) 11, a micro-sequencer unit (μSEQ) 10, a floating point computation unit (FPU) 12, a system input/output interface unit (SIO) 13, and a high speed data transfer interface unit (BMC) 14. The latter unit permits direct high speed data transfers between I/O units and the main memory, the information being transferred in relatively high speed time bursts. Hence such unit is often referred to as a "burst multiplexer channel" (BMC) interface unit. Transfers to and from I/O units are made via suitable transceiver units 26 and 27.

The processor units 10, 11 and 12 and the I/O communication channel units all communicate via the systems bus 15 as shown.

Suitable control and microcode signals among the processor units, utilizing an appropriate microcode control store 17, are shown as being transferred via a microcontrol bus 18 and a microcode bus 19. Exemplary operation of such control and microcode signals is described, for example, in the aforesaid Carberry et al. patent. It should be noted that, while the Carberry et al.

system does not utilize a floating point unit, such units for providing floating point computations are well known to those in the art. Use of a suitable I/O interface unit would be well known to the art, an example thereof being depicted in the Carberry et al. patent as a system I/O interface unit which is described in detail therein. An exemplary high speed I/O channel is shown in U.S. Pat. No. 4,403,282 issued on Sept. 6, 1983 to Samson, and also need not be described in more detail here.

Figure 2:
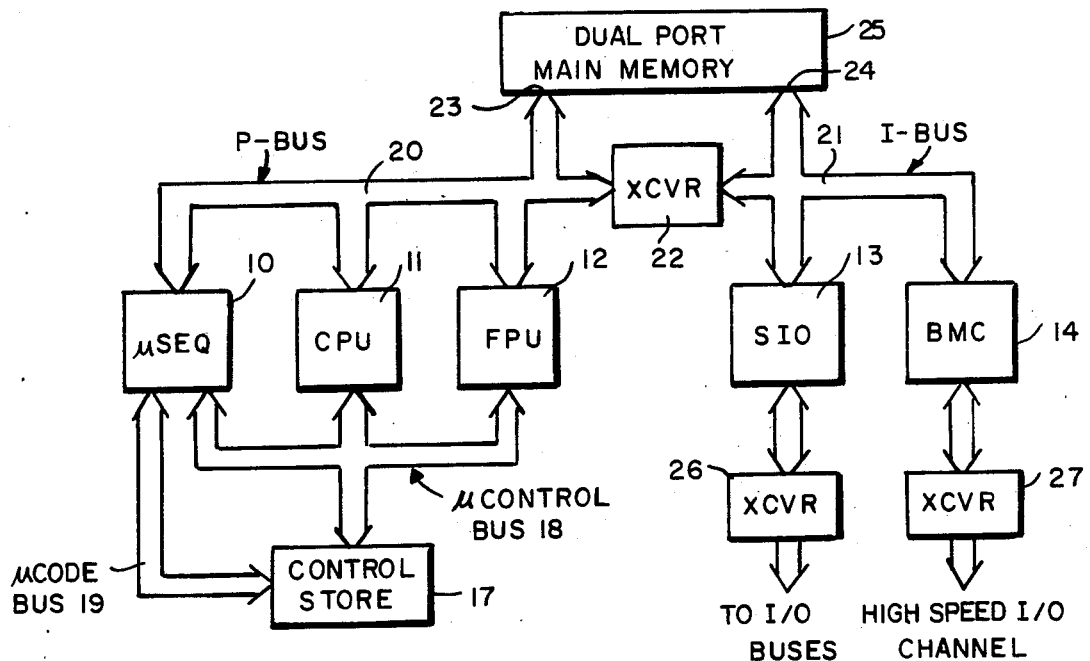
FIG. 2 shows a block diagram of a data processing system of the invention utilizing a dual common system bus configuration.

An alternate configuration of the system shown in FIG. 1 for use with a dual port main memory is shown in FIG. 2. As can be seen therein, the same system component units 11-14 are depicted. A pair of separate buses identified as P-bus 20 and I-bus 21 are coupled to each other through a suitable transceiver unit 22 which permits or prevents the transfer of information between buses 20 and 21 in either direction. Transceiver units of the type required are well known to those in the art. The processor operating units 10, 11 and 12 are directly connected to P-bus 20 while the I/O interface units 13 and 14 are directly connected to I-bus 21. P-bus 20 is connected to a port 23 of dual port main memory 25 while I-bus 21 is connected to port 24 thereof.

In either configuration, in order to provide communication from any of the system components to the main memory or to provide communication between two system components, effective system bus protocols must be devised in order to provide for the correct transfer of such information and to assure that appropriate priorities for use of the bus are established.

In the particular system discussed herein, the CPU unit 11, SIO unit 13 and BMC unit 14 are arranged to control bus operations. Operations of the SEQ unit 10 and FPU unit 12 are in effect controlled by the CPU 11 which controls the supply of data between units 10 and 12 and the system bus. Accordingly in the description which follows, system bus control relates essentially only to operations controlled by the CPU, SIO, and BMC units.

Figure 3:
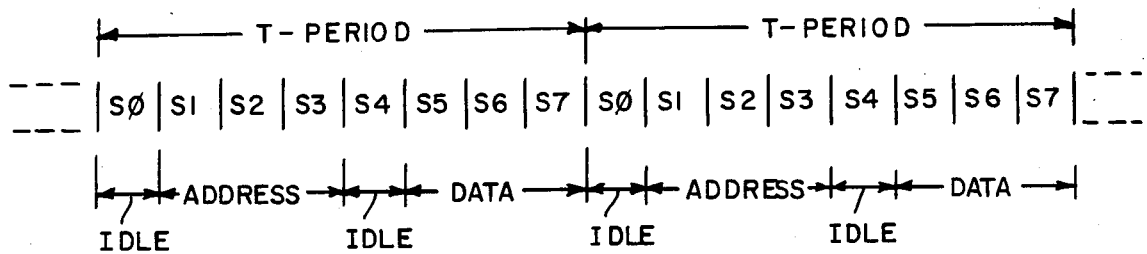
FIG. 3 shows a timing diagram of an exemplary operating time cycle for a transaction on the buses of FIGS. 1 or 2.

In the embodiments discussed herein each bus transaction utilizes a unique timing system for placing each bus address and data information on the bus. The timing of the system operation is synchronized by providing a selected time period, hereinafter referred to as a "T-period," during which various system components which may have need for the bus bid for access to it in the T-period which is prior to the one in which they desire to make an information transfer. In the particular embodiment discussed, the bus is a 32-bit address/data bus and has a defined address transfer time during the first half of such T-period and a defined data transfer time during the second half thereof. For such purpose the T-period is divided into eight subperiods as shown in FIG. 3 in which each T-period comprises subperiods S0 through S7. Address information is transferred only during subperiods S1, S2 and S3 while data is transferred normally during subperiods S5, S6 and S7 although in some instances, as during block data transfers, data can be transferred during subperiods S1-S3. The address and data subperiods are separated by "idle" subperiods, such idle subperiods being at S0, prior to the address transfer subperiods and at S4 immediately following the address transfer subperiods.

Figure 4:
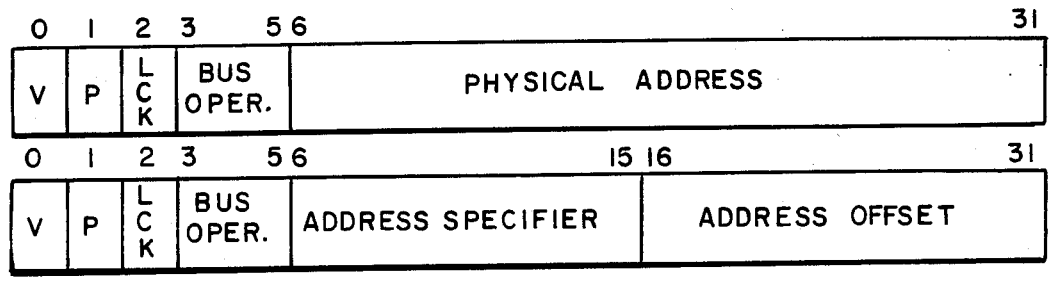
FIG. 4 shows address information formats for use in placing address information on the buses of FIGS. 1 or 2.

In accordance with the bus protocol established in the embodiment discussed, the address information is in the form of a 32-bit address word which can have two different formats depending on whether the address represents a physical address in main memory or represents an address outside of main memory, e.g. in another system component or in an I/O device external to the system. The address word format is shown in FIG. 4, the most significant 6 bits of the address word (bits 0-5) being interpreted as command information and the least significant 26 bits (bits 6-31) being interpreted as address information.

The status of bit 0 (V) indicates either that a valid address is being placed on the bus or that no valid address is being placed on the bus and the bus is to remain idle for the current T-period. Bit 1 (P) indicates whether or not the address being placed on the bus is a physical address of a location in main memory or is a non-physical address in a location of an address space which is outside of main memory. Bit 2 (LCK) indicates whether or not the system component which has current control of the bus requires such control to be extended over one or more additional T-periods so that such component can effectively "lock" the bus to itself for its exclusive use. Such an operation, for example, may be required if the system component is doing a "read-modify-write" operation which requires several T-periods for completion and which cannot be interrupted. The bus locking bit may be asserted at the start of a read operation and must be followed in the subsequent T-period either by a write operation to the same address as that which was first read, or by an idle bus cycle. The bus lock condition may be continued through more than one idle bus cycles until the requestor is ready to complete the indivisible operation (i.e., read-modify-write). The LCK signal of bit 2 has significance even if the valid bit V is unasserted in a particular T-period.

Bits 3-5 (BUS OPER) specify the bus operations which are to be performed in accordance with the following table:

| 3 4 5 | Operation |
|---|---|
| 0 0 0 | Reserved |
| 0 0 1 | Write Block (2 Double Words) |
| 0 1 0 | Read Double Word |
| 0 1 1 | Read Block (2 Double Words) |
| 1 0 0 | Write High Byte |
| 1 0 1 | Write Low Byte |
| 1 1 0 | Write Single Word |
| 1 1 1 | Write Double Word |

As can be seen in the above table, read and write block operations involve the transfer of two double words, a double word comprising two 16-bit words. Accordingly, each block transfer involves the transfer of four 16-bit words. Such block operations require the transfer of two consecutive double words and require at least two T-periods. All operations which are not block operations are generally referred to as simple operations or simple bus transfers.

As can be seen in the upper address format of FIG. 4, when bit 1 indicates that a valid address located in main memory in being placed on the bus, bits 6-31 specify the location in main memory. Accordingly, main memory may contain up to 128 megabytes of information.

When bit 1 indicates that a valid address is not in main memory, bits 6-15, as in the lower address format of FIG. 4, specify the particular component to which the address is to be supplied and bits 16-31 indicate the address offset in such component. The address specifier in a particular embodiment of the system, for example, may utilize unary encoding on bits 6-15 in accordance with the following table:

| Address Space | Encoding - A/D <6-15> |
|---|---|
| SIO | 0 0 1 0 0 0 0 0 0 0 |
| BMC | 0 0 0 1 0 0 0 0 0 0 |
| FPU | 0 0 0 0 1 0 0 0 0 0 |
| Console | 0 0 0 0 0 1 0 0 0 0 |
| (reserved) | 0 0 0 0 0 0 1 0 0 0 |
| (reserved) | 0 0 0 0 0 0 0 1 0 0 |
| (reserved) | 0 0 0 0 0 0 0 0 1 0 |
| Micro-Sequencer | 0 0 0 0 0 0 0 0 0 1 |
| (reserved) | 1 0 0 0 0 0 0 0 0 0 |
| (reserved) | 0 1 0 0 0 0 0 0 0 0 |

Figure 5:
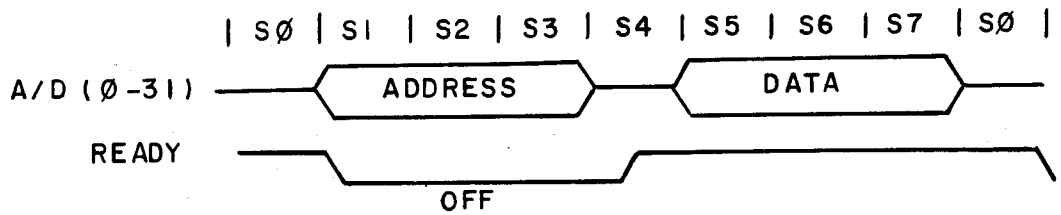
FIG. 5 shows a timing diagram representing a simple transfer of data on said buses.
Figure 6:
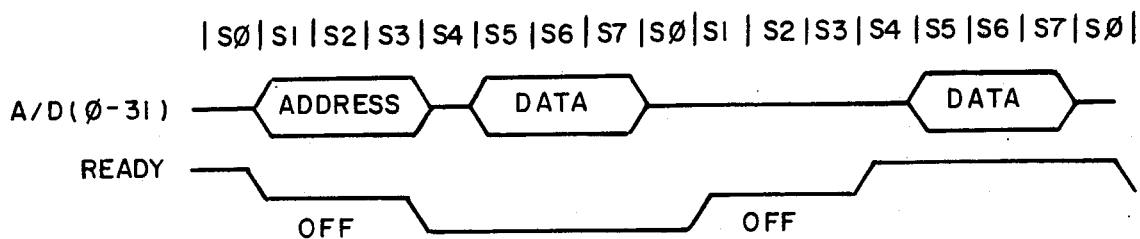
FIG. 6 shows a timing diagram of a transfer requiring more than one operating time period.
Figure 7:
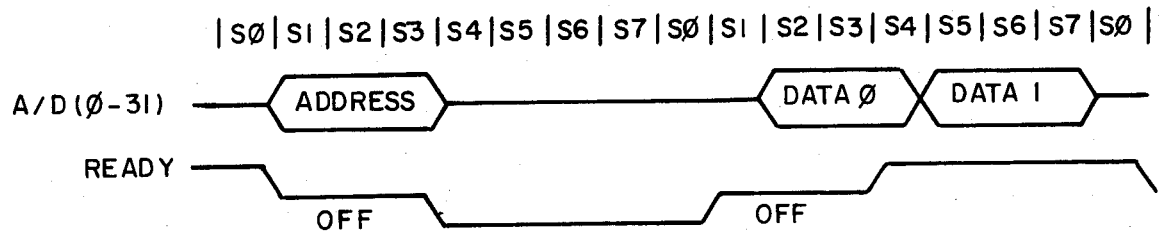
FIG. 7 shows a timing diagram for reading a block of data information via a bus.

FIGS. 5-7 provide examples of timing diagrams depicting data transfers both for simple data transfers and block data transfers. As can be seen in FIG. 5, for a simple transfer wherein the data can be supplied in one T-period, the address is placed on the system bus in subperiods S1-S3 while the data is placed on the bus during subperiods S5-S7. The significance of the READY signal is discussed in more detail below.

For a simple transfer which requires more than one T-period the bus remains under control of the system component initiating the transfer, as shown in FIG. 6, wherein the address is placed on the bus during subperiods S1-S3 of a first T-period, data being placed on the bus during subperiods S5-S7 thereof and further being placed on the bus during subperiods S5-S7 of the subsequent T-period.

For a block read transfer as shown in FIG. 7, the address is placed on the bus during subperiods S1-S3 of a first T-period while the data which is read is then placed on the bus during subperiods S2-S4 and S5-S7 of the subsequent T-period.

Figure 8:
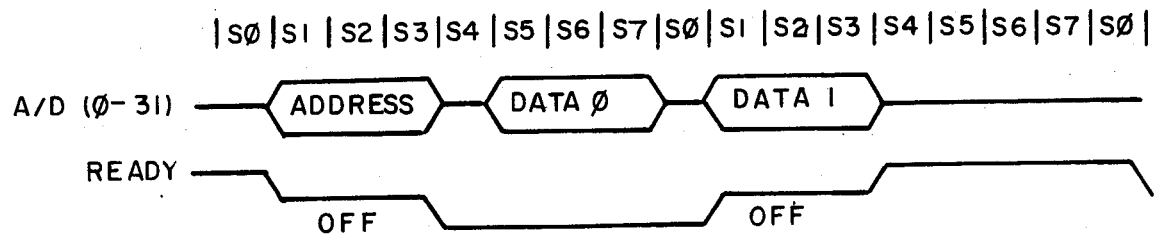
FIG. 8 shows a timing diagram for writing a block of data information via a bus.

For block write transfers, as shown in FIG. 8, the address is placed on the bus during S1-S3 of a first T-period and the data is immediately placed thereon during subperiods S5-S7 of the same T-period and subperiods S1-S3 of the subsequent T-period.

In order to understand the various bus protocol signals which are required to achieve the above operations and to establish priorities among system bus users, it is helpful to explain each of the pertinent signals involved as follows.

A READY signal allows bus transfers to take more than one cycle. Unless a READY signal is asserted at the end of a current T-period, the current access by a particular system component which has control of the bus is continued into the next T-period.

A BUS REQ 1 signal is asserted by a requestor in a current T-period in a bid for access to the bus on which it resides in the next T-period. Thus, in the configurations of both FIGS. 1 and 2 each of the components must assert a BUS REQ 1 signal when it bids for access to the bus.

A BUS REQ 2 signal is asserted in a dual bus configuration of FIG. 2 by a system component requestor which is resident on the I-bus 21 only and is so asserted in order to signal the intent of such component to acquire access to the P-bus 20 during the next T-period. Accordingly, in the single bus configuration of FIG. 1 BUS REQ 2 is irrelevant and can be ignored.

A Priority In (PRI IN) signal indicates that no higher priority component in the system is bidding for access to the bus on which the requestor resides for use in the next T-period. Thus a requestor may use the bus on which it resides in the next T-period if it has correctly asserted a BUS REQ 1 signal (and the bus is not locked by any previous user) and both the READY and the PRI IN are asserted. Discussion of the generation of and use of PRI IN signals is discussed in more detail below.

A Remote Status (REM STAT) signal indicates in a dual bus configuration of FIG. 2 that the bus on which the requestor does not reside (i.e., a "remote" bus), will be available for use by such requestor during the next T-period. Accordingly a requestor has system-wide access to both the P-bus and the I-bus during the next T-period if it has access in that T-period to the bus on which it resides and if the REM STAT signal is asserted. Further, if the requestor is an I-bus resident it must have also correctly asserted a BUS REQ 2 signal. However, if the requestor is a P-bus resident it does not require the assertion of a BUS REQ 2 signal. Moreover, the REM STAT signal is significant only if a PRI IN is asserted so that the requestor has priority for the bus, as discussed in more detail below.

For the CPU unit 11 and the SIO unit 13, the REM STAT signal has an additional function when the PRI IN signal is not asserted. Such units must indicate that the current T-period is to be an idle one by driving the valid bit (V) and bus locking bit (LCK) to an unasserted state if both the PRI IN and the REM STAT signals are not asserted so long as the bus is not locked by any other component and so long as the READY signal is asserted. Such a feature allows external logic to force the bus to be idle when necessary. In single bus systems the REM STAT signal to the CPU unit 11 can be used to force idle bus T-periods and the REM STAT signal to all other units can be permanently placed in an assertive state.

A Select Acknowledge (SEL ACK) signal is asserted during the second half of a T-period by the system component which is specified by the address which is placed on the bus in the first half of the T-period when the P-bit of an address word indicates that the address location is outside memory. The SEL ACK signal is reasserted in subsequent T-periods if the READY signal is not asserted. Such SEL ACK signal serves as an assist to the logic which controls system-wide transfers in a dual bus system but has no significance and is ignored in a single bus system.

Almost all of the control information needed for the successful transfer of data via a single or dual common bus system is derived from the basic system timing discussed above and from the contents of the bus at the address portion of the T-period. As mentioned above, the READY signal is a key signal for controlling transfer of data and is used to indicate the successful completion of a desired data transfer operation. If, for example, the system has a relatively slow operating memory, or other system component, which is unable to complete a transfer in the time allotted during a particular T-period, such memory or component may use the READY line (which is a separate dedicated control line) to extend the transfer into one or more succeeding T-periods.

The READY signal is a tri-state signal which is in its high impedance state during that portion of the T-period which is normally used for address transfer and is actively driven by only one bus user at any other time. During idle bus T-periods and during the first T-period of a block transfer, READY is driven by the requestor which is in control of the bus. During simple bus transfers and during the second and subsequent T-periods of block transfers, READY is driven by the data source component during the current transaction.

If READY is unasserted at the end of any T-period, the requestor which had intended to drive an address on to the bus during the subsequent T-period is prohibited from doing so. If a simple read or write transfer is continued into the next period, or if a block read transfer is continued beyond the second T-period by the absence of a READY signal, the data transfer is repeated in each succeeding T-period until the READY is asserted. In the case of a block read, the entire double-double word block transfer is repeated in each T-period. Block write operations are handled somewhat differently so that the absence of READY only has the effect of preventing the start of a new transfer. Block write data transfers are not repeated as a result of the absence of a READY signal. The use of the READY signal can be seen in the examples shown in FIGS. 5–7 wherein the READY signal is asserted by the end of the data transfer in a simple transfer of FIG. 5 thereby indicating that the bus is available to another system component. In the simple transfer of FIG. 6 the READY signal remains unasserted at the end of the first T-period so that the subsequent T-period is not made available to any other system component since it is still in use by the system component which has current control of the bus. During the block read transfer operation of FIG. 7 the READY signal is not asserted at the end of the first T-period so as to retain the bus for availability by the current requestor so as to complete the block read operation. Similarly in FIG. 8 the READY signal is not asserted at the end of the first T-period so that the bus remains available to the current requestor for completion of the block write operation.

The system utilizing the above signals can be readily arranged to provide for suitable priority arbitration between bus requestors. Determination of which requestor will use the bus during the next T-period is a function of the READY signal, the bus locking bit (LCK), and the priority arbitration signals, $\overline{\text{BUS REQ 1}}$, $\overline{\text{BUS REQ 2}}$, PRI IN and REM STAT. The READY signal, if not asserted, causes the current transaction to be continued into the next T-period.

If READY is asserted but the bus is locked by another system component, only the component currently using the bus can and must use the bus during the next T-period. When READY is asserted and the bus is not locked, the bus becomes available and bus access is determined by the priority arbitration logic. In a dual bus configuration such logic consists of individual priority chains for each of the two buses and a separate priority mechanism for dealing with system-wide accesses, i.e., access to both system buses in a dual bus configuration.

Figure 9:
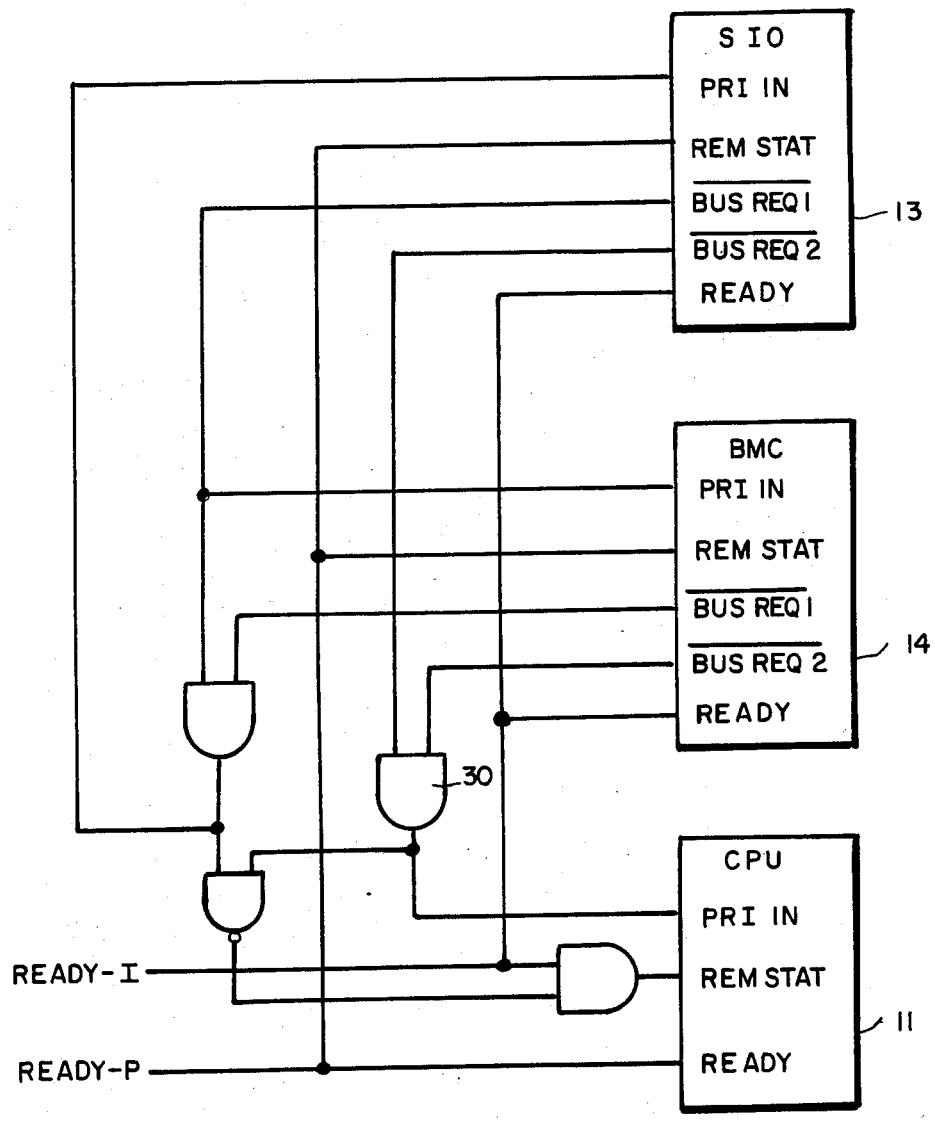
FIG. 9 shows a block diagram for explaining priority signals among components utilizing the dual bus configuration of FIG. 2.
Figure 10:
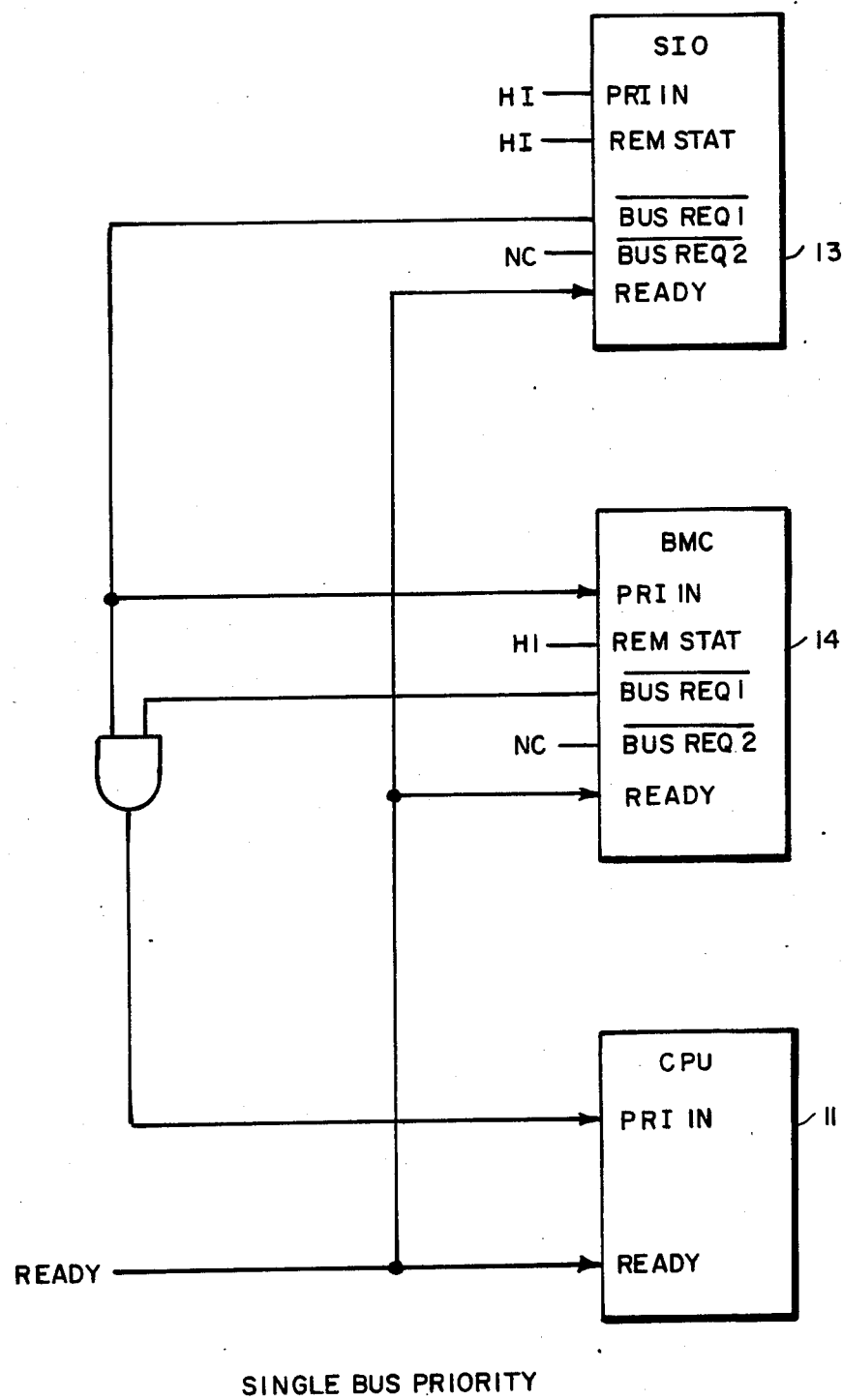
FIG. 10 shows a block diagram for explaining priorities among system components when using a single bus configuration of FIG. 1.

Typical priority mechanisms for a dual bus system and a single bus system are shown in FIGS. 9 and 10, respectively. In FIG. 9, for example, the priority chain for each bus is constructed from the $\overline{\text{BUS REQ 1}}$ signal and the PRI IN signals of the requestors which reside on that bus. A requestor may bid for use of the bus by asserting $\overline{\text{BUS REQ 1}}$. The PRI IN signal seen by that requestor is ANDed with its $\overline{\text{BUS REQ 1}}$ signal to generate the PRI IN for the next requestor in the chain. As can be seen in FIG. 9, in the particular configuration discussed herein the priority chain involves only the bus control operating units, i.e., the SIO unit, the BMC unit 14 and the CPU unit 11, the priorities being arranged in that order so that the CPU has the lowest priority and the SIO unit has the highest. The fact that a PRI IN signal is received by a component which is requesting access to the bus is interpreted by such component to mean that no higher priority requestor is currently asserting a $\overline{\text{BUS REQ 1}}$ signal. Moreover, the fact that a current requestor is asserting a $\overline{\text{BUS REQ 1}}$ signal means that no lower priority requestor can receive a PRI IN signal. Thus, if the bus is available, i.e., it is not locked and the READY signal is asserted, a requestor which is currently asserting a $\overline{\text{BUS REQ 1}}$ signal and receives a PRI IN signal from those units having a higher priority will gain control of the bus for the next T-period.

The PRI IN signal at the start of each of the two priority chains is generated by external logic which controls system-wide bus access and bus synchronization and which allows access to and control of the bus by the memory system. In the particular embodiment described the output of the I-bus priority chain indicates to the external control logic whether either I-bus resident (SIO 13 or BMC 14) wishes to utilize the I-bus 21. The P-bus priority chain terminates with the CPU unit 11 which as the lowest priority requestor in the system receives a PRI IN signal but has no need to assert any $\overline{\text{BUS REQ 1}}$ signal (as seen in FIGS. 9 and 10). Thus, the CPU unit 11 gains control of the bus whenever it sees a PRI IN signal asserted by the higher priority units indicating that no other bus user having a higher priority is requesting the bus.

IN the dual bus configuration of FIG. 2, a requester which desires system-wide access to both buses must determine that it is entitled to the bus which is remote to it in addition to the bus on which it resides. Because the I-bus components always have priority over P-bus components in requesting either bus, a P-bus resident which intends to perform a systemwide transfer need only ascertain that the I-bus is not otherwise being used by checking the REM STAT signal. It need not signal its own desire to use the I-bus in advance.

An I-bus requestor which desires to gain access to the P-bus must indicate such desire by asserting a $\overline{\text{BUS REQ 2}}$ signal to prevent any P-bus residents from driving addresses or data onto the P-bus. The $\overline{\text{BUS REQ 2}}$ signals from the I-bus are used in generating the PRI IN signal which is at the start of the P-bus priority chain. In the typical dual bus system shown in FIG. 2 utilizing the logic shown in FIG. 9, the PRI IN which starts the P-bus priority chain is generated by AND gate 30 combining the two $\overline{\text{BUS REQ 2}}$ signals from the I-bus.

The priority arbitration mechanism is complicated by the fact that, in a two bus configuration, the P-bus and the I-bus may be operating independently of each other in one T-period while a requestor is bidding to use both the P-bus and the I-bus for a system-wide access during the next T-period. One of the two buses required for the system-wide access may become available while the other does not, either because a higher priority bus user is requesting the other bus or because the READY signal was not asserted on one of the buses. The resolution of such problems is primarily involved in the use of the REM STAT signal.

Thus, if a P-bus resident desires system-wide access to the bus, it is possible that an I-bus resident may be simultaneously requesting access to the I-bus but not to the P-bus. It is also possible that the READY signal may not be asserted on the I-bus. In either case the P-Bus resident will see a PRI IN signal asserted but will not be permitted to drive the I-bus. Such condition will be indicated to the P-bus resident by the non-assertion of the REM STAT signal whenever the PRI IN signal is asserted and the I-bus is not available to a P-bus resident. Similarly, if an I-bus resident requests system-wide access and the READY signal is not asserted on the P-bus, it may see a PRI IN signal but still be unable to drive the bus. Under such condition the REM STAT signal is not asserted to I-bus residents whenever the PRI IN signal is asserted and the P-bus is not available to an I-bus resident.

A further and perhaps more troublesome condition arises when a requestor intends to perform a system-wide transfer and the bus which is remote to such component is available but the bus on which the requestor itself resides is unavailable because the READY signal is not asserted. In such a case the remote bus is left with no one to drive it during the address portion of the overall T-period. The external logic deals with such situation by causing SIO or CPU to force the V and LCK bits to their unasserted status to indicate an idle bus cycle. Such operation can be performed by driving the PRI IN signal and by the non-assertion of the REM STAT signal to either a P-bus resident (i.e., the CPU UNIT) or an I-bus resident (the SIO unit).

In a single bus implementation of FIG. 1, a single priority chain is created using merely the $\overline{\text{BUS REQ 1}}$ and the PRI IN signals of all the requestors on the single common bus. A PRI IN signal at the start of this chain comes from the memory system while the CPU unit as the lowest priority requestor is at the lowest end of the chain. The REM STAT signal of the CPU unit can be used by external control logic to force idle bus cycles. All other remote status signals and the $\overline{\text{BUS REQ 2}}$ signal are ignored. The above discussed priority arbitration mechanism can be summarized by the following rules for bus usage which are designed to assure that the bus is always controlled by only a single bus user at any one time.

1. Any requestor is entitled to use the bus on which it resides in the next T-period if it has correctly asserted a $\overline{\text{BUS REQ 1}}$ signal, if the bus is not locked by the assertion of an LCK signal by any other component, and the PRI IN signal and READY signals are both asserted.

2. The lowest priority bus requestor of the three bus users (i.e., the CPU unit 11) which is a P-bus resident, is entitled to the P-bus if the bus is not locked by another system component and the PRI IN and READY signals are both asserted. Since it is the lowest in the chain of requestors, the CPU unit does not need to assert a $\overline{\text{BUS REQ 1}}$ signal.

3. Any requestor which is entitled to use a bus in the next T-period must do so, if only to indicate an idle bus cycle by driving the V and LCK bits to their unasserted status.

4. A P-bus resident has system-wide access to the P-bus and the I-bus during the next T-period if it has access to the bus on which it resides and the REM STAT signal is asserted.

5. An I-bus resident has system-wide access to the bus in the next T-period if it has access to the bus on which it resides and if it has correctly asserted a $\overline{\text{BUS REQ 2}}$ signal and the REM STAT signal is asserted.

6. An I-bus resident requestor may not assert a $\overline{\text{BUS REQ 2}}$ signal unless it is also asserting a $\overline{\text{BUS REQ 1}}$ signal.

7. A requestor may initiate a Bus Lock operation (by asserting the proper status for the LCK bit) only during a read operation for which it has system-wide access to the bus. The requestor may continue to lock the bus during idle bus cycles, if needed, in order to complete an indivisible transfer operation, for example.

8. A requestor which has locked the bus is by definition entitled to the bus in the next T-period and must use it. The requestor, however, may not perform any access to an address other than that to which the bus was originally locked.

9. The CPU unit 11 on the P-bus 20 and the SIO unit 13 on the I-bus 21 must drive the status of their V and LCK bits to an unasserted state onto the bus if the bus is not locked and if the READY signal is asserted and both PRI IN and REM STAT signals are not asserted.

10. The transceiver control logic, which is external to the logic for the other system component units, must properly determine when one bus should drive the other and must then enable the transceiver accordingly.

In connection with transceiver control for certain operations the separate buses in a dual bus system of FIG. 2 must act as a single bus. For this reason the transceiver circuitry is utilized for connecting the two buses together. Such transceiver control logic must operate in accordance with the following rules.

1. The P-bus 20 must drive the I-bus 21 during the address portion of a T-period if the READY signal is asserted on both buses, if the bus is not locked by any system component, and if the output of the I-bus priority chain is asserted indicating that the I-bus is available for use by P-bus residents.

2. The I-bus 21 must drive the P-bus 20 during the address portion of a T-period if the READY signal is asserted on both buses, if the bus is not locked, and if the PRI IN which is at the start of the P-bus priority chain is not asserted indicating that an I-bus resident has requested access to the P-bus.

3. Both the P-bus and the I-bus must be logically independent of each other during the address portion of a T-period if the READY signal is asserted on both buses, if the bus is not locked, and if the PRI IN signal which is at the start of the P-bus priority chain is asserted and the output of the I-bus priority chain is not asserted.

4. The P-bus and the I-bus must remain logically independent of each other if they are currently operating independently and if the READY signal is unasserted on either bus.

5. The P-bus and the I-bus must continue to operate as one bus and the direction of an address transfer must remain the same as in a previous T-period if the bus is locked.

6. If one of the two buses would have driven the address for the other bus but cannot do so because its own READY signal is not asserted, and the READY signal for the other bus is asserted, the external control logic must cause the address for the other bus to be driven by forcing the PRI IN and REM STAT signals to their unasserted states to the appropriate unit.

7. If the P-bus and I-bus are operating as one bus and the specified operation is a write transfer, the transceiver is enabled at the data portion of a T-period as it was at the address portion thereof.

8. If both buses are operating as one bus and the specified operation is a read transfer, the direction control of the transceiver at the data portion of a T-period is the opposite of what it was at the address portion of the T-period. A tri-state output enable of the transceiver is activated only if the SEL ACK signals indicate that the source of the read data is on the other side of the transceiver from the requestor of the data.

The transceiver control logic is also involved in the coordination of the READY signals in system-wide transfers for dual bus configurations. If the SEL ACK signals indicate that the bus element specified by the address which is placed on the bus in the first half of a T-period is on the other side of the transceiver from the requestor, the READY signal of the bus on which the requestor resides must be driven from that of the remote bus. If such READY signal is not asserted, the transceiver must continue to connect the two buses until the data is transferred. If, however, the addressed system element is on the same side of the transceiver as the requestor, and the bus is not locked, the remote bus can be freed to operate independently even if the READY signal is not asserted. The READY signal need not be driven to the remote bus from the bus on which the requestor resides unless the bus is locked.

The timing circuitry provides four overlapping clocks by a bipolar clock generator circuit. The basic time of such clocks is referred to as one T-period, the four clocks being decoded by the units to further divide each T-period into the eight equal subperiods. In one exemplary embodiment for example, the length of a T-period may be set at 400 nanoseconds resulting in an S-interval of 50 nanoseconds. Since a signal is expected to be stable at the output of a unit 55 nanoseconds after the clock transition which causes it to be asserted, the signal being strobed into a unit should be stable at the input to the unit 45 nanoseconds before the end of the next S-interval, less any delay through external logic, such as the bus transceiver unit.

As seen in FIGS. 5-8, the READY line is always in an off state during S1, S2 and S3 of any T-period. The bus component which is assigned to drive the READY in a given T-period may do so during S4 and must do so from the start of S5 through the end of S0 of the next T-period. The READY signal is then strobed into the units during S7. In addition, the READY signal from one bus is used in the generation of the remote status signals for the other bus. These signals are also strobed during S7. Since a certain amount of external logic is involved in the generation of the priority arbitration signals, the generation of a REM STAT signal will generally be the deciding factor in the timing of the READY signal in dual bus configurations.

The PRI IN signal will be strobed into the units during S7. In order to provide adequate time for the external priority arbitration logic to generate this signal, the BUS REQ 1 and BUS REQ 2 signals must first be asserted during S5 such that they are stable by the start of S6. The REM STAT signal will be strobed into the units during S7. The bus request signals should therefore remain asserted through S∅ in order to provide sufficient hold time.

The SEL ACK signals must be asserted from S4 through S0 by the bus component which decodes the address as referring to itself. The assertion of a SEL ACK signal must be repeated during the same S intervals of subsequent T-periods if the READY signal is not asserted. The SEL ACK signals of all the bus users on one side of the transceiver are OR-ed together to control the output enable of the transceiver for the data transfer during S5, S6 and S7. Because the SEL ACK signals drive the transceiver control directly, they must be driven such that they are stable from the start of S5 and once asserted must not be unstable during the entire data transfer time. If the bus component which is responsible for asserting a SEL ACK signal is unable to supply data in a given T-period, the assertion of SEL ACK can be delayed by one S-interval in that T-period but must be stable from the start of S6 for the control of the READY signal. As seen in FIG. 9, in connection with priority logic shown therein, the signals at the left-hand side of the drawing indicate communication with the memory and the transceiver control logic. The READY signals from the two buses and the two signals taken from key points in the priority chains (P RMST and P PRI) are used by the transceiver control to determine the direction of transfer. The signals T REQ or I REQ, I ENAB and P ENAB are not part of the bus definition but are signals whereby the configuration can request the use of the I-bus or force an idle cycle on either the I-bus or the P-bus. The following should be noted:

1. The normal state of the system is for I REQ to be unasserted, I ENAB to be asserted, and P ENAB to be asserted.

2. External control logic can request the use of the I-bus by asserting both I REQ and I ENAB.

3. External control logic can force the I-bus to be idle if it is READY and not locked by asserting an I REQ signal and by not asserting an I ENAB signal.

4. External control logic can force the P-bus to be idle if it is READY and not locked by not asserting a P ENAB signal.

For the single bus configuration priority shown in FIG. 10 the priority logic consists of a single two-gate priority chain. The use of the two signals S-bus ENAB and S-bus REQ is analagous to that of the corresponding signals in the dual bus priority logic of FIG. 9.

Figure 11:
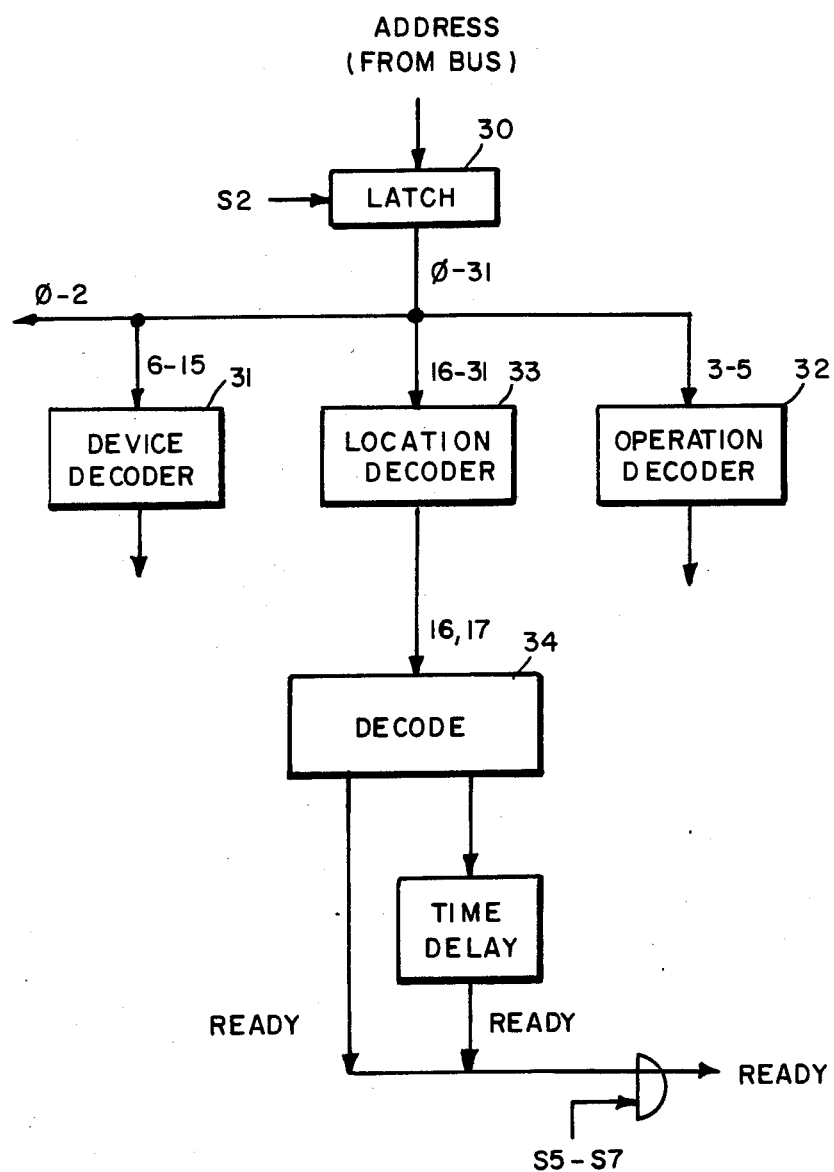

FIGS. 11-14 depict more specific block and logic diagrams showing the generation of the various bus protocol signals discussed above. The block diagram of FIG. 11 shows an exemplary technique for the generation of a READY signal by a device to or from which data is to be supplied, e.g. the μSEQ unit 10. The appropriate bits of the memory address from a bus are latched into the unit via a latch 30 at subperiod S2 and supplied to various decoders, e.g. a device decoder 31 which responds to bits 6-15 to determine whether the particular unit in question is the one which is to receive or supply data to the bus, an operation decoder 32 which responds to bits 3-4 to determine the type of operation which is to be performed, and a location decoder 33 which responds to bits 16-31 to determine the location of the data to be received by or supplied from the unit. The decoded address information is appropriately supplied for use by the unit for handling the data for the operation involved. In a particular embodiment, for example, selected bits of the location address are used to determine the overall time period for performing such operation. In a particular example shown in FIG. 11 the first two bits (16, 17) of the decoded location information are appropriately decoded to provide a READY signal which is either supplied during the current S5-S7 subperiods (i.e. on an undelayed basis) or on a delayed basis during the S5-S7 subperiods of a subsequent cycle, depending on the overall time period required to complete the particular operation being performed by the unit involved. For example, for a particular unit, e.g. the microsequencer unit 10, the operations may be such that when bits 16, 17 of the location decoded output are 01, 10 or 11 the operation takes three cycles and the READY signal is not supplied until subperiods S5-S7 of the third cycle, while for a 00 output the READY signal is supplied during S5–S7 of the current cycle.

The logic for providing the necessary internal control signals to permit the CPU 11, SIO 13 and BMC 14 to utilize the bus (single or double) as a current "bus master" is shown in FIGS. 12–14, wherein the logic responds to the REM STAT, PRI IN and READY signals supplied thereto via suitable flip-flop units 35 at subperiod S7 as discussed with reference to FIGS. 9 and 10.

While the particular embodiments shown and discussed above represent specific implementations of a bus protocol concept of the invention herein, the invention is not to be construed as limited thereto inasmuch as modifications thereof may occur to those in the art within the spirit and scope of the invention. Hence the invention is not to be construed as limited except by the appended claims.

What is claimed is:

1. A data processing system for preventing bus conflicts in the placing of data and address information on a common bus means when multiple system components attempt to place said information substantially concurrently on said common bus means, said system components including a central processing unit, one or more shared memory units, and one or more input/output units, and said common bus means providing for the transfer of said information among said system components, said system comprising means connection to all system components for generating a clock signal to provide a plurality of information transfer time periods, each transfer time period comprising a plurality of more than two subperiods for use in controlling access to said common bus means by said system components;

means at each system component capable of accessing said common bus means for placing on said common bus means address information for defining a type of bus cycle operation and addresses for said bus operation during a plurality of address subperiods there being idle subperiods before and after said address subperiods;

means in each said system component responsive to the placing of information on said common bus means by one of said system components for inhibiting the placement of subsequent information on said common bus means by any other said system component, the use of said idle subperiods thereby preventing said bus conflicts.

2. In a data processing system of claim 1 wherein said inhibiting means includes means for generating a first control signal for inhibiting access to said common bus means by said other system components when a system component is transferring data information on said common bus means until said data information transfer is completed.

3. In a data processing system of claim 2 wherein said clock signal generating means generate a clock signal having eight subperiods 0–7.

4. In a data processing system of claim 3 wherein subperiods 1, 2 and 3 are used for address or data information transfers, subperiods 5, 6 and 7 are used for data information trasnfer, and subperiods ∅ and 4 are subperiods in which said bus means is idle.

5. In a data processing system of claim 4 wherein said address information specifies the validity of an address being placed on said bus means, whether or not said address is located in said system memory unit, and whether the system component using said address information desires to retain access to said bus means for more than one transfer time period.

6. In a data processing system in accordance with claim 5 wherein said address information is contained in a 32-bit word, a first bit specifying the validity of said address, a second bit specifying whether said address is located in said system memory unit, a bus lock bit specifying said desire to retain access to said bus means, a fourth plurality of bits specifying said type of bus operation, and a fifth plurality of bits defining said address.

7. In a data processing system of claim 6 wherein said fifth plurality of bits defines a location in said system memory unit when said second bit is in a first state and defines a location other than in said system memory unit when said second bit is in its other state.

8. In a data processing system of claim 1 wherein selected system components include means for generating a first bus request signal when a said selected system component desires access to said common bus means; and means for controlling the status of said bus lock bit.

9. A system in accordance with claim 1 and further including means for determining priority of access to said common bus means by selected ones of said system components.

10. In a data processing system of claim 9 wherein said common bus means is a single common bus to which each of said system components has direct access.

11. In a data processing system of claim 9 wherein said common bus means includes a first bus to which first selected system components have direct access and a second bus to which second selected system components have direct access, and a transceiver means controllable to provide indirect access by said first selected components to said second bus and indirect access by said second selected components to said first bus, said system memory unit having first and second ports, said first bus providing communication to said first port and said second bus providing communication to said second port.

12. In a data processing system of claim 11 wherein each of said second selected components further having means for generating a second bus request signal together with said first bus request signal when requesting access to said first bus.

13. In a data processing system of claim 12 and further including means for generating a remote status signal with respect to each of said first and second buses for indicating that a bus is available for indirect access thereto by system components which do not have direct access thereto.

* * * * *